(No Model.)
A. G. STEINBRENNER.
DRAW BAR FOR RAILWAY CARS.
No. 528,117.  Patented Oct. 23, 1894.
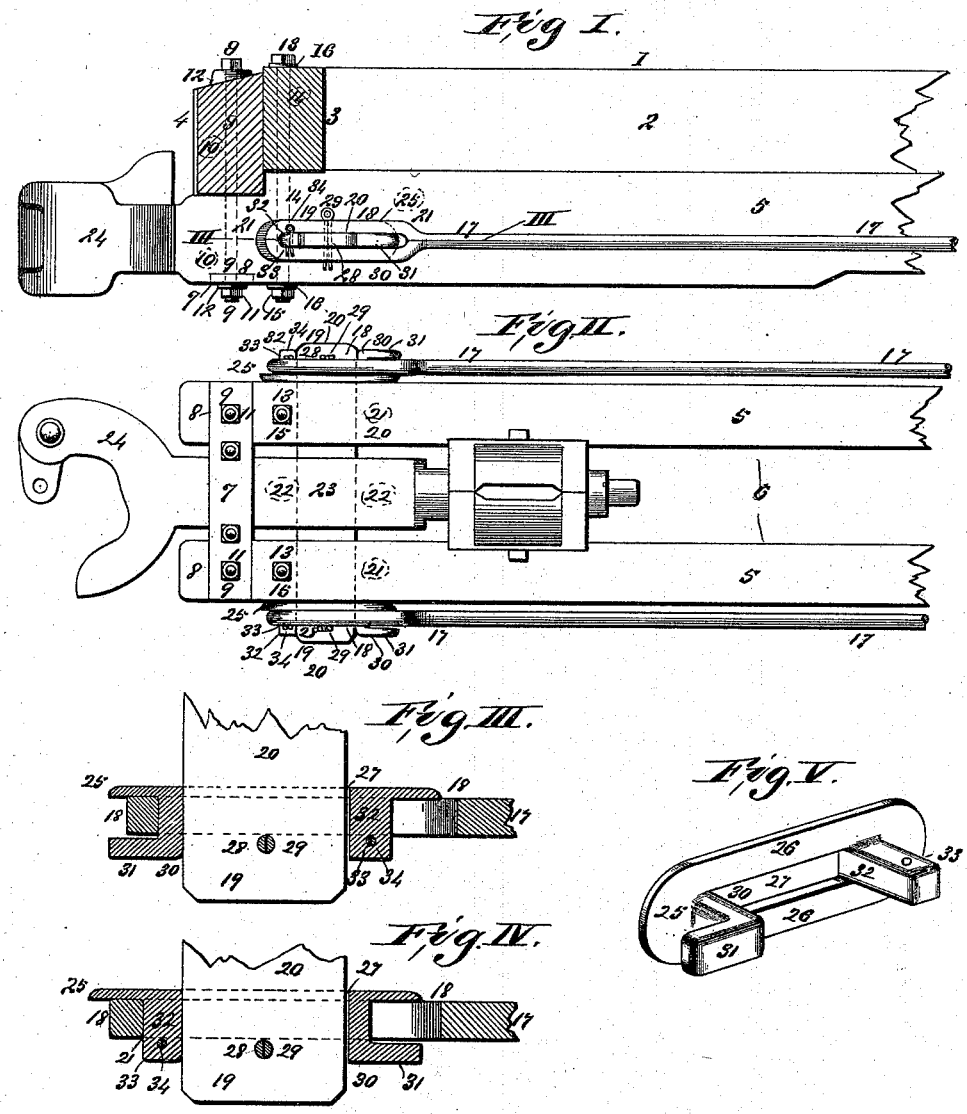
Attest:
Benj. A. Knight.
E. Knight.
Inventor:
Andrew G. Steinbrenner
By Knight Bros.
Attys.

UNITED STATES PATENT OFFICE.

ANDREW G. STEINBRENNER, OF ST. LOUIS, MISSOURI, ASSIGNOR TO ENRIQUE S. BARREIRAS, OF SAME PLACE.

DRAW-BAR FOR RAILWAY-CARS.

SPECIFICATION forming part of Letters Patent No. 528,117, dated October 23, 1894.

Application filed May 4, 1894. Serial No. 510,103. (No model.)

*To all whom it may concern:*

Be it known that I, ANDREW G. STEINBRENNER, of the city of St. Louis, in the State of Missouri, have invented a certain new and useful Improvement in Tension-Slack Equalizers for Draw-Rods of Cars, of which the following is a full, clear, and exact description, reference being had to the accompanying drawings, forming part of this specification.
This invention relates to a device for the instantaneous equalizing or taking up the slack engendered by tension or otherwise in the draw-rods of the continuous draft gear of cars, and in other metal bars or rods that are subjected to stretching by tension and otherwise, and to equalizing the varying length of long continuous metal bars and rods, that are subject to both expansion and contraction from changes of temperature; and the invention consists in features of novelty hereinafter fully described and pointed out in the claims.

Figure I is a detail side elevation with the draw-rod attached, showing the front timbers in section. Fig. II is an inverted plan view of the same with the longitudinal sill and the front timbers omitted. Fig. III is an enlarged detail section taken on line III—III Fig. I, showing my adjustable equalizer in one position. Fig. IV is a similar view showing the equalizer in its reverse position, and Fig. V is a detached perspective view of my adjustable equalizer.

Referring to the drawings:—1 represents the bed frame of a car; 2, the longitudinal sills; 3, the head-block and 4 the buffer block.

5 represents the longitudinal side pieces of the draft-frame 6, which sills are coupled together at near each end by the transverse bars 7, that are bedded in the counter sinks 8, in the under sides of said sills 5 of said drawframe, and are secured thereto and to said buffer-block 4, by the screw-tie bolts 9, that are bedded in their perforate seats 10. 11 are the screw nuts that fasten said bolts and 12 are washers strung on said bolts, that bed said heads and nuts.

13 are the screw tie bolts, that are bedded in their perforate seats 14, in the head block 3 of said bed-frame 1, and in the side pieces 5 of said draw-frame 6, and are there secured by the screw nuts 15, and 16 are washers that bed said head and nuts.

17 represents the twin metallic draw-rods the elongated open draw-heads 18 of which draw-rods are respectively mounted on the projecting holder ends 19, of the coupling bar 20, which coupling bar is loosely mounted and is adjustable, and plays at its respective ends in the elongated holder slots 21, in the longitudinal side pieces 5, of the draft frame 6, and in its center in the elongated slot 22 in the draft bar 23 of the coupling hook 24.

25 represents my transpositive equalizers, that constitute slack adjuster devices for taking up the slack caused by the longitudinal stretching of the draw-rods 17, under the severe tension they are subject to, while drawing loaded trains up heavy grades, and the concussion incident to the draft over rough or uneven tracks, especially when the strain is aggravated by slack draw-rods that foster impetuous jerking of the draft attachments, while surmounting impediments.

My said transpositive equalizers 25, are so named because of their functions, through which by transposing their positions endwise (under certain given conditions hereinafter described) they have the capacity to take up or reduce the slack of the metallic draw-rods of cars, or of other metal rods that have been subjected to tension stretching.

26 represents the elongated oval bed-plates of said equalizers, in the longitudinal open slotways 27 of which on each side and on each end of the draft frame 6 are seated the respective ends of the respective coupler holder bars 20, in the projecting key holder ends 19 of which are the key holes 28 in which (when set up) the cotter lock keys 29 are seated, and lock the coupling. 30 represents the minor adjustment lug that projects from near one end of the outside of said oval bed-plate 26 of said transpositive equalizer 25, close adjacent to one end of its slotway 27 or with its base secured within said end of said slotway. The said minor adjustment lug may be about three-quarters of an inch in its working adjustment width, or approximately about half the working adjustment width (within the loop 18 of the draw rod) of the major adjustment lug, both of which lugs may in like respective proportions be varied in their adjustment width, without departing from the essential features of the invention.

31 represents an angle hook that projects at a right angle from the outer end of said minor adjustment lug and runs parallel with and outside of the draw heads 18 of the draw-rods 17.

32 represents the major adjustment lug that may be about an inch and a quarter in its working adjustment width or approximately about twice the working width of the minor adjustment lug 30.

33 is a key-hole through the projecting end of said major adjustment lug, and 34 is a spring lock key that is seated in said key hole and in combination with said angle hook 31, locks the transpositive equalizer 25, in its longitudinal movable seat while at the same time it is not cramped from longitudinal retrogression within the bounds of the loop 18, to the extent of said bounds, when the train reverses its movement.

The operation of the device has been in some measure brought forward in the description of the several parts to elucidate, their constructive working conformation, but is further elucidated as follows:

To save the great loss of time incident to the common practice of cutting and rewelding when metal draw-rods have been severely stretched by the heavy tension to which they have been subjected and the loss of integrity to the metal of said rods in frequent re-heating to a weld heat as well as for use with other stretched draw and other coupling rods, I have devised my transpositive equalizer, which is hereby described in its equalizer functions in connection with its use with draw-rods of cars. The said equalizers 25 are in their initial position before the adverse tension stretching of the draw rods mounted as described on each end of the coupling bar 20, in their working position within the elongated draw-loops 18, respectively at each end of the draw-rods with the respective minor narrow width lugs 30, at the respective outer terminal ends of said draw head loops 18 as shown in section in Fig. III. When the draw-rods 17 have been tension stretched by use to the extent approximately of about three-fourths of an inch, the slack play that is thereby engendered can be taken up, in a few minutes without delay, beyond the necessary stoppages for other current purposes without side tracking the car, or running it into the repair shops. All that is necessary to do to effect the taking up or reduction of said slack of the stretched draw-rods 17, with this device, is to withdraw the cotter key 29 from one end of the coupling bar 20 at one end of the draft frame 6. Then remove said coupling bar, withdraw the cotter keys 34 from the major adjustment lugs 32, that project from the draw-heads 18, at said end of the draw-rod. Then turn my transpositive equalizer end for end, from its said initial position shown in Fig. III, in which the narrow say about three-fourths inch, lugs 30, are at the terminal ends of said draw-head 18, to the re-adjusted position shown in Fig. IV, in which the approximately double width say one and one-quarter inch lugs 32, occupy said terminal ends of said draw head loop 18, thus taking up or reducing the slack that has been adversely effected by the tension stretch of said draw-rods. Then reinsert said coupling bar 20 and said lock keys 29 and 34, and the draw-bars are thus immediately stiffened to their work and the loose play and uneven jerk draft of the same (that is injurious alike to said draw-rods and to the surmounting car and its freight) is thus at once largely avoided and consequently also the extreme rapid adverse restretching of said draw-rods, is largely avoided. When however, in course of time said draw rods eventually require a second reduction of their slack, the process above described is repeated at the other end of the draft frame, by the above described transposition of my transpositive equalizer 25, at that end also, thus also taking up or reducing the secondary stretch of said draw-rods without cutting or rewelding. The said process may be again repeated by the use of transpositive equalizers having respective wider adjustment lugs 30 and 32, the ends of the coupling bars 20 in such cases being slightly reduced in width or the draw head loops 18 being of a slightly increased length to seat said increased width of said lugs 30 and 32 without any departure from the essential features of my invention.

I have described and shown the invention as applied to the draw rods of cars, but it is evident that it can also be substantially alike used for the reduction of the slack engendered by the tension stretch of other draw, and tie rods, &c., without any departure from the essential features of this invention.

The cotter lock key 34 seated in the lug 32 is operative in either transposable position of the equalizer as respectively shown in Figs. III and IV and the angle hook 31 serves as a positive retainer of its holder end when in the position shown in Fig. III and also when transposed as shown in Fig. IV when the train backs up, it serves as a clutch retainer hold against the face of the inner end of the draw head loop 18.

I claim as my invention—

1. In a tension slack equalizer for stretched metal rods, the combination of the stretched slack metal rod having a loop holder end, the coupling holding bar that engages in said loop and the transpositive equalizer seated on said holder-bar and said equalizer having the respective minor and major adjustment lugs of diverse widths that are respectively adjustable from one to the other of the respective edges of said holder bar to reduce the slack engendered by the tension stretch of said metal rod: substantially as shown and described.

2. In a tension slack equalizer for stretched metal rods, the combination of the bed plate 26, provided with the elongated open slot 27, the narrow minor adjustment lug 30 and the wide major adjustment lug 32, the said lugs located and projecting from said bed-plate adjacent to reverse ends of said open slot 27, the metal rod 17, and the draw-head loop integral with said rod: substantially as shown and described.

3. In a tension slack equalizer for stretched metal rods, the combination of the rod 17, having the loop draw-head 18, the holder bar 20, and the transpositive equalizer 25, having the bed plate 26, provided with the elongated open slot 27, and having the narrow minor adjustment lug 30, with the angle retention hook 31, and the wide major adjustment lug 32, with its cotter key 34, substantially as shown and described.

4. In a tension slack equalizer for stretched metal rods, the combination of the draft frame 6, having the side pieces 5, provided with the elongated slots 21, the coupling hook 24, provided with the elongated slot 22, the draw rods 17, having the draw-head loops 18, the coupling holder bar 20, seated in working adjustment in said elongated slots 21 and 22, the transpositive equalizer 25, having the head-plate 26, provided with the elongated open slot 27, and having the narrow minor adjustment lug 30, with the angle retention hook 31, and the wide major adjustment lug 32, and the respective cotter keys 29 and 34; substantially as shown and described.

ANDREW G. STEINBRENNER.

In presence of—
   GEO. W. TAUSSIG,
   BENJN. A. KNIGHT.